(12) United States Patent
Hao et al.

(10) Patent No.: US 7,899,052 B1
(45) Date of Patent: Mar. 1, 2011

(54) MEMORY STRUCTURE FOR RESOLVING ADDRESSES IN A PACKET-BASED NETWORK SWITCH

(75) Inventors: Yi-Hsien Hao, Saratoga, CA (US); Scott McDaniel, Villa Park, CA (US); John K. Lenell, Huntington Beach, CA (US); Andrew M. Naylor, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/492,265

(22) Filed: Jan. 27, 2000

Related U.S. Application Data (60) Provisional application No. 60/117,481, filed on Jan. 27, 1999, provisional application No. 60/127,147, filed on Mar. 31, 1999.

(51) Int. Cl.
*H04L 12/28* (2006.01)
(52) U.S. Cl. .......................... 370/392; 370/412
(58) Field of Classification Search .................. 370/392, 370/395.32, 395.7, 395.72, 412, 413; 710/56, 710/310; 711/108, 131, 149, 209, 216, 221
See application file for complete search history.

(56) References Cited

U.S. PATENT DOCUMENTS

| | | | | |
|---|---|---|---|---|
| 5,293,486 A | * | 3/1994 | Jordan et al. .................. | 710/220 |
| 5,313,582 A | * | 5/1994 | Hendel et al. .................. | 710/56 |
| 5,386,413 A | * | 1/1995 | McAuley et al. ............. | 370/392 |
| 5,765,036 A | * | 6/1998 | Lim ................................ | 711/147 |
| 5,860,136 A | * | 1/1999 | Fenner .......................... | 711/201 |
| 5,916,309 A | * | 6/1999 | Brown et al. .................. | 710/52 |
| 5,917,821 A | * | 6/1999 | Gobuyan et al. .............. | 370/392 |
| 5,930,359 A | * | 7/1999 | Kempke et al. ............... | 713/160 |
| 5,938,736 A | * | 8/1999 | Muller et al. .................. | 370/392 |
| 5,940,375 A | * | 8/1999 | Soumiya et al. .............. | 370/249 |
| 6,021,132 A | * | 2/2000 | Muller et al. .................. | 370/412 |
| 6,061,362 A | | 5/2000 | Muller et al. | |
| 6,067,300 A | * | 5/2000 | Baumert et al. .............. | 370/413 |
| 6,081,522 A | * | 6/2000 | Hendel et al. ................. | 370/412 |
| 6,088,793 A | * | 7/2000 | Liu et al. ....................... | 712/239 |
| 6,151,644 A | * | 11/2000 | Wu ................................ | 710/52 |
| 6,272,551 B1 | | 8/2001 | Martin et al. | |
| 6,279,097 B1 | * | 8/2001 | Kaku ............................ | 711/216 |
| 6,425,021 B1 | * | 7/2002 | Ghodrat et al. ................ | 710/22 |
| 6,427,185 B1 | * | 7/2002 | Ryals et al. ................... | 711/100 |
| 6,504,851 B1 | | 1/2003 | Abler et al. | |
| 6,516,352 B1 | | 2/2003 | Booth et al. | |
| 6,529,519 B1 | * | 3/2003 | Steiner et al. ................. | 370/412 |
| 6,614,796 B1 | * | 9/2003 | Black et al. ................... | 370/403 |

OTHER PUBLICATIONS

Johnson, H. "Detailed Guide to Fast Ethernet", Fast Ethernet Dawn of a New Network, Chapter 3, Prentice Hall PTR, USA, (XP-002149327), 1996, pp. 112-114, pp. 170-174.

* cited by examiner

*Primary Examiner* — Ricky Ngo
*Assistant Examiner* — Christine Ng (57) ABSTRACT

Memory structure, and packet-based switch including the memory structure, having Address Resolution Table and Packet Data Buffer table employing a shared memory. Transmit Descriptor Table also may share memory. Address Resolution Table can be implemented with direct mapping, for which destination address key direct-mapped address search may be used. The memory structure and switch implement an IEEE Std. 802.3 communication protocol via multiple ports.

60 Claims, 7 Drawing Sheets

FIG. 1

| Address[7:0] | Data[63:0] |
|---|---|
| 00-CF | Packet Data |
| D0 | Port 0 Transmit Descriptor |
| D1 | Port 1 Transmit Descriptor |
| D2 | Port 2 Transmit Descriptor |
| D3 | Port 3 Transmit Descriptor |
| D4 | Port 4 Transmit Descriptor |
| D5 | Port 5 Transmit Descriptor |
| D6 | Port 6 Transmit Descriptor |
| D7 | Port 7 Transmit Descriptor |
| D8 | Port 8 Transmit Descriptor |
| D9-DF | Unused |
| E0-FF | 32 ARL Table Entries |

FIG. 2

| Address[16:0] | Data[63:0] |
|---|---|
| 0000-00FF | Memory Block 0 |
| 0100-01FF | Memory Block 1 |
| 0200-02FF | Memory Block 2 |
| 0300-FEFF | Memory Block 3 to 2046 |
| FF00-FFFF | Memory Block 2047 |
| 10000-1FFFF | Optional Memory Block 2048-4095 |

MEMORY STRUCTURE FOR RESOLVING ADDRESSES IN A PACKET-BASED NETWORK SWITCH

CROSS-REFERENCE TO RELATED APPLICATIONS

This patent application claims the benefit of the filing date of U.S. Provisional Patent Application Ser. No. 60/117,481, filed Jan. 27, 1999, entitled ETHERNET SWITCHING and U.S. Provisional Patent Application Ser. No. 60/127,147, filed Mar. 31, 1999, entitled ETHERNET SWITCHING, the entire contents of both of which are expressly incorporated herein by reference.

BACKGROUND OF THE INVENTION

The invention herein relates to packet-based network switches; particularly to high-speed multiport packet-based network switches; and more particularly to memory structures, and associated operational techniques, for high-speed multiport packet based network switches.

Present-day throughput demands on packet-based switched networks have created the necessity for switches exhibiting increasingly higher performance. It is most desirable to achieve the transmission speed of the physical transport medium, i.e. to be close to "wire speed." For high-speed LAN protocols, including those collectively called "Fast Ethernet," switches typically associated with operations incorporating OSI Reference Model Layer 2 (Data Link Layer) and Layer 1 (Physical Layer) are employed to meet the performance requirements reliably and economically. As the complexity of such devices increases, however, significant trade-offs, for example, between performance, scalability, and affordability may arise.

SUMMARY OF THE INVENTION

The present invention includes a shared memory structure which has an Address Resolution Table for resolving addresses in a packet-based network switch; and a Packet Storage Table that is adapted to receive a packet for storage in the packet-based network switch.

In another aspect of the invention, the Address Resolution Table is implemented using an associative memory structure, including, without limitation, a direct-mapped (one-way associative) memory. This memory may be searched for destination addresses using a destination address key direct-mapped address search. The shared memory structure also can include a Transmit Descriptor Table. It is desirable to have a Transmit Descriptor Table corresponding with a packet-based network transmit port.

Furthermore, the shared memory structure may include a Free Buffer Pool having multiple memory buffers, each having a pre-determined number of memory locations associated therewith. A bit-per-buffer technique can be used for tracking buffer status also can be used.

The invention can be practiced in a packet-based network switch which implements IEEE Standard 802.3 communication protocols. In the switch, the associated Address Resolution Table and the Packet Storage Table also employ a shared memory structure. The switch may have multiple ports and, indeed, it is contemplated that a switch, according to the present invention, have four, eight, nine, or more, such ports.

DETAILED DESCRIPTION OF THE INVENTION

The present invention is described in the context of the communication protocol defined by IEEE Standard 802.3, and supplemented, for example, by IEEE Standard 802.3u, which also is known as 100Base-T or "Fast Ethernet." Thus, embodiments of the present invention can be implemented in hybrid, or dual speed, 10/100BASE-T devices. One skilled in the art would realize that this contextual description is exemplary, and that the invention can be practiced in the context of other packet-based communication protocols, and at wire speeds surpassing those embodied, for example, by the 100BASE-T standard. Also, a skilled artisan would be familiar with the IEEE Standard 802.3, and thus would require no additional elaboration herein of these Standards to practice the invention. Furthermore, such IEEE Standards 802.3 are incorporated by reference herein in their entirety.

A packet-based Layer 2 switch typically includes fundamental components such as physical layer transceivers (PHY), media access controllers (MAC), an address management unit, a packet switching fabric, random access memory, and the like. The physical transceiver layer, MAC, and other aspects of a packet-based switch can be defined by standards such as, for example, the IEEE 802.3 group of specifications (hereinafter referred to as "Ethernet" or, where appropriate, "Fast Ethernet"). The integration of some of these components is known in the art. However, total integration of all components onto a single chip may create performance trade-offs, depending, for example, upon the complexity of the switch. As the number of supported nodes increases, it becomes more difficult to meet power requirements and die size constraints, and still operate at, or near, wire speeds.

Among the functions supported, a Layer 2 switch resolves the destination of frames received at an ingress port by building a table of destination addresses and an associated egress port. An Ethernet destination address typically is a 48-bit value. Therefore, building a direct mapping for each possible address can require $2^{48}$ memory locations. Recognizing that only a small number of the $2^{48}$ addresses may be used in a LAN system, it is desirable to reduce the memory required to store the addresses, and to minimize the probability of an address search miss. Techniques to realize these goals include the use of a content-addressable memory (CAM), binary search algorithms, and hash tables with chain entries of depth greater than 1. However, such techniques can be costly to implement, and can degrade the frame rate resolution of destination addresses such that operation at wire speed can be difficult to maintain under some circumstances.

Figure 1:
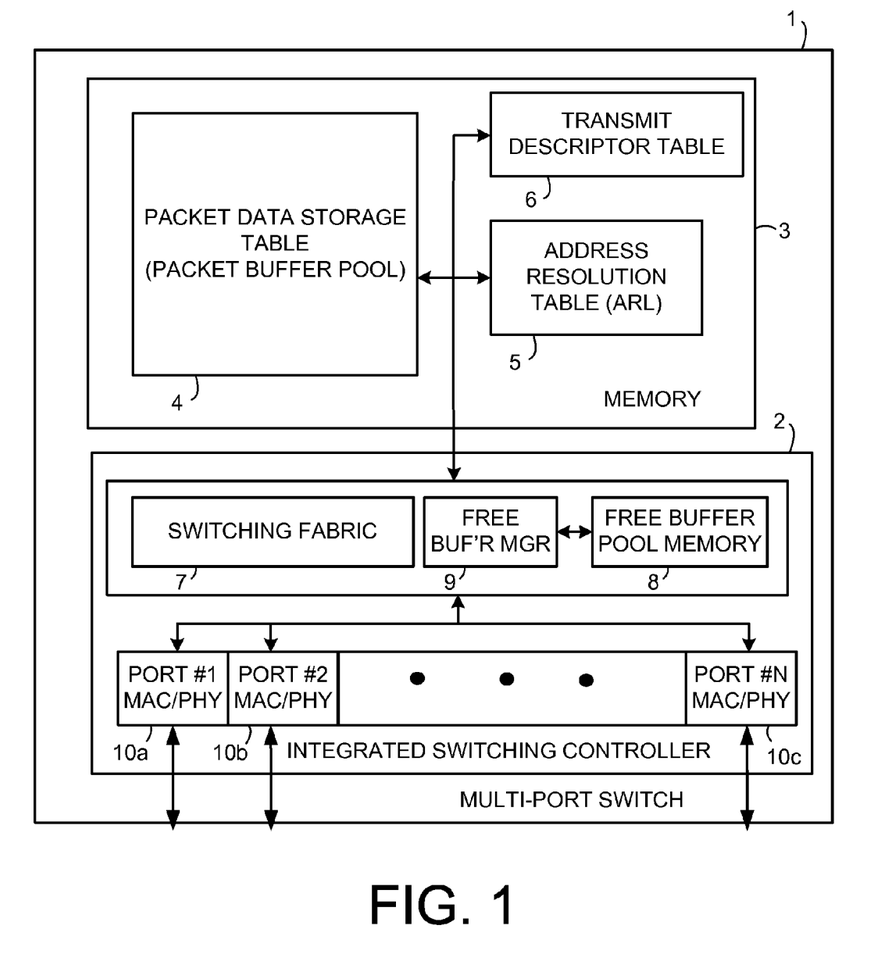
FIG. 1 is an illustration of a multi-port packet-based switch having an embodiment of the present invention.

FIG. 1 illustrates a packet-based multiport switch 1 which includes an integrated switching controller 2, and a memory 3, external to switching controller 2. According to an embodiment of the present invention, it is contemplated that Packet Data Storage Table 4 be co-located with Address Resolution Table 5. In particular, it is most desirable that Packet Data Storage Table 4 share memory with ARL Table 5. Further, memory 3 also can include Transmit Descriptor Table 6. Integrated switching controller 2 can include switching fabric 7, free buffer pool memory 8, free buffer pool memory manager 9, and MAC/PHY components 10a, 10b, and 10c.

An advantage of having a shared memory structure 3 as contemplated by the present invention is the reduction in device pin count and in system implementation costs. An advantage of implementing the invention as a direct-mapped address table is that the number of memory accesses required for address resolution per Ethernet frame can be about one cycle per Ethernet frame for address learning, and about one cycle per Ethernet frame for address resolution. Furthermore, the memory addressing logic required to access the ARL table can be minimized. It is desirable to use a direct-mapped/one-way associative address table, indexed by a key, for example, extracted from the thirteen least significant bits of the 48-bit Ethernet frame destination address field.

In one embodiment of the invention, ARL Table 5 may be used without a shared memory structure. In this case, it is desirable for the table to be configured as an one-way associative, i.e., direct mapped, memory. In embodiments of the invention in which the ARL Table 5 is shared with Table 4, Table, 6, or both, as well as with pool memory 8, it may be desirable to use another type of memory structure, including, without limitation, an n-way associative memory, a hash table, binary searching structure, and a sequential searching structure. One skilled in the art could readily select the appropriate search technique for a given structure.

By using the one-way associative memory configuration for ARL Table 5, address resolution can be made simple, and memory access expeditious, thereby reducing the switching bandwidth needed to determine the packet destination port address, and to allow the Packet Data Storage Table 4 to be co-located with ARL Table 5. This direct-mapped configuration of ARL Table 5 reduces the switching bandwidth needed to determine the packet destination port address, and permits an associated device to operate at, or near, wire speed. Also, the direct mapping can be a significant factor in implementing the single, shared memory structure for the ARL Table 5 and Packet Data Storage Table 4, which facilitates switch operation at wire speeds.

The implementation of shared memory 3 and the implementation of a direct-mapped ARL Table 5, alone and together, are more desirable techniques to increase bandwidth than merely increasing clock frequency because operations using faster clock frequencies typically result in increased power requirements, and a need for faster memory which, itself, can add to the cost, and complexity, of the associated product. Thus, where it is desired to contain device power requirements and to minimize switch cost, the aforementioned approaches are beneficial.

By using a preselected portion of the packet destination address as an index into ARL Table 5, an address match can be resolved quickly, and the packet passed to the appropriate port for transmission. This destination address key direct-mapped address search enables multi-port packet-based switch 1 to be operable, for example, at wire speed in full-duplex, non-blocked, 100Base-TX operations. One skilled in the art would realize that the contemplated invention can be practiced in environments other than 100Base-T environments and at wire speeds in excess of 100 Mb/s.

Figure 2:
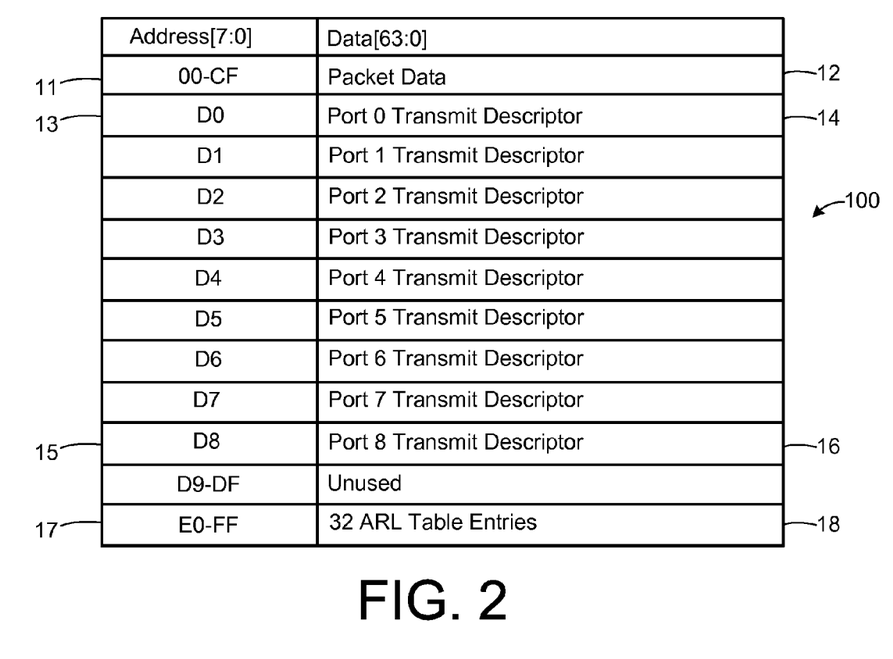
FIG. 2 is an illustration of one memory block configuration having an embodiment of the shared memory structure according to the invention herein.

FIG. 2 provides an illustration of one embodiment of a memory map 100 that can implement a block of memory such as memory 3 in FIG. 1. At first address locations 11 (00-CF), there exists a single buffer 12 for an individual packet. A transmit descriptor table, similar to Transmit Descriptor Table 6 in FIG. 1, is created by allocating sufficient memory beginning at first memory location 13 (D0) to second memory location 15 (D8) which encompass port 0 transmit descriptor 14 through port 8 transmit descriptor 16. Also, an address resolution table similar to ARL Table 5 in FIG. 1, can be created by allocating a memory segment 17 such that it contains a preselected number of ARL table entries 18 (e.g., 32 entries).

With one buffer per packet, only one transmit descriptor read per packet is performed, eliminating multiple memory accesses to find, for example, a linked list of buffers in an external memory. Given the starting address of the frame and the length of the frame in the transmit descriptor, only one access is executed in order to locate the entire packet to be transmitted. In a typical linked-list buffer approach, employing a small, fixed buffer block size, additional transmit descriptor reads may be required in order to locate each subsequent block. Each additional read signifies an undesirable reduction in available bandwidth.

Furthermore, the single buffer per packet approach as contemplated herein reduces the number of buffers that need to be searched. A skilled artisan would appreciate the significant bandwidth savings that can be attributed to the one buffer per packet approach. The single buffer-per-packet technique enhances the feasibility of the bit-per-buffer free buffer pool tracking technique, as well, and the need to search a large buffer pool structure can be mitigated or eliminated. In view of the foregoing, it can be seen how embodiments of the contemplated invention effect switch operation at, or near, wire speed.

Figure 3:
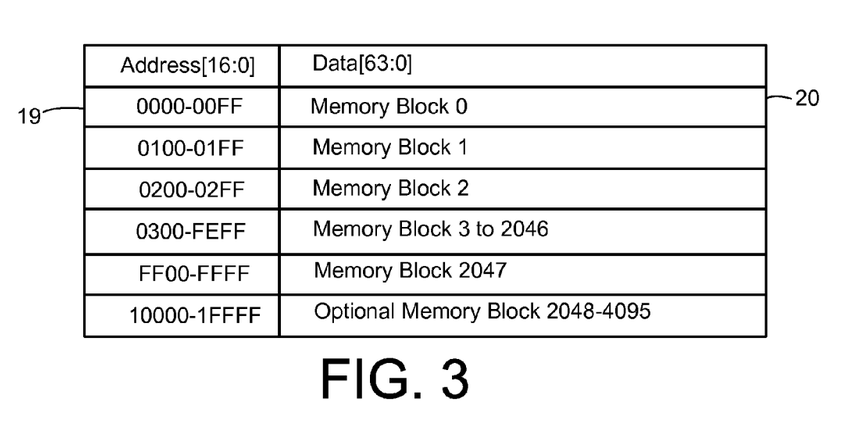
FIG. 3 is an illustration of plural memory blocks, each having the memory structure illustrated in FIG. 2.

FIG. 3 is illustrative of the scalability of this shared memory structure in that the memory structure described in FIG. 2 can be allocated in address range 19 of memory block 20. A skilled artisan would realize that one or more such blocks can be used to achieve the desired design criteria.

Figure 4:
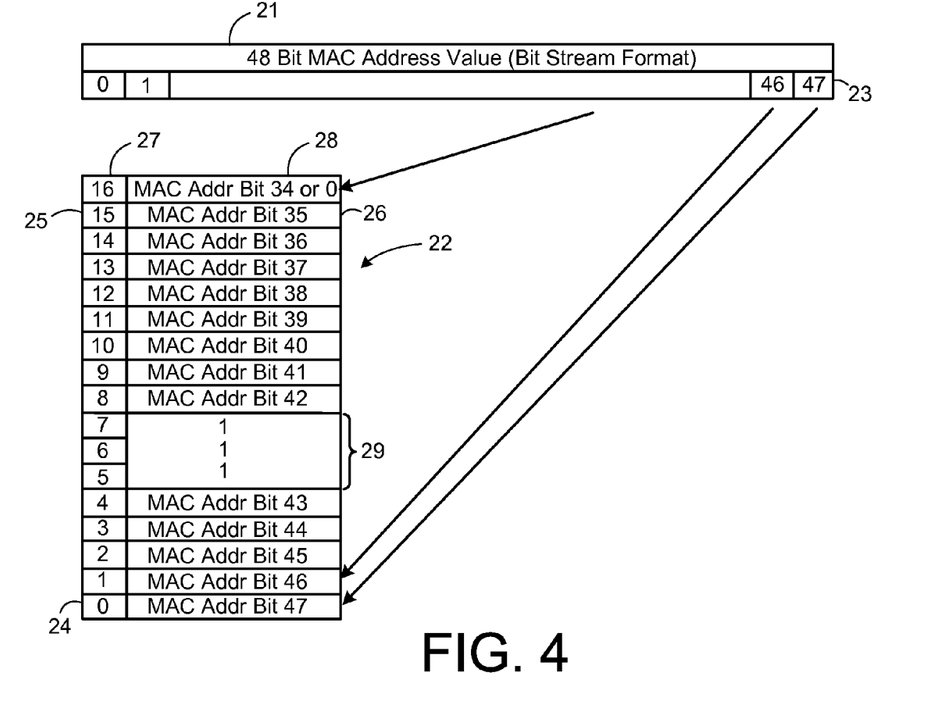
FIG. 4 is an illustration of one embodiment of an ARL Address Table of the present invention.

FIG. 4 illustrates one embodiment of the direct-mapped address table indexing using, for example, a 13-bit key derived from the 48-bit MAC address value, i.e., the Ethernet frame destination address field 21. As previously described, the least significant bit 23 of address value 21 is mapped to the least significant bit 24 of key 22. In this example, the address table entries are offset in the address space from the index by an offset 29, which is, therefore, included in the key 22. The most significant bit location 25 can obtain its value 26 from bit 35 of the corresponding MAC address value 21. If desired, a fourteenth bit from MAC address 21 can be used to provide a bit value 28 for the most significant bit 27 for key 22.

Thus, a packet-based switch implementing the shared memory structure according to the contemplated invention performs one memory read for address resolution, and one memory write for address learning, to the address table for each frame received. The reduced overhead provided by embodiments of present invention leads to a reduction in memory accesses per Ethernet frame (in this example, a frame is 64 bytes in length, and the associated bus width is 64 bits). The number of such memory accesses can be characterized as: one cycle per frame for address resolution; one cycle per frame for address learning; one cycle per frame for transmission read; one cycle per frame for transmission write; one cycle per eight bytes for a frame data read; and one cycle per eight bytes for a frame data write.

The single access for both read and write can be attributed to the single-entry direct-mapped address table. Using this configuration, each MAC address maps to a single location in the address table. Therefore, only one access may be needed to read or write the MAC address. A single-entry direct-mapped address table may increase the probability of address collisions. However, the probability of these collisions can be reduced by mapping over a larger number of MAC address bits, such as the 14 bits illustrated in FIG. 4. The single MAC address read and write for each Ethernet frame can contribute to the ability of switch 1, in FIG. 1, to operate at wire speed, in a full-duplex, non-blocking manner.

To further enhance the functionality of switch 1 in FIG. 1, a transmit descriptor request may be made during the transmission of a previous frame, thereby removing the transmit descriptor reads from the generation of latency. Also, it is desirable that a FIFO structure be used so that a first portion of the FIFO data can be read to initiate transmission while the remaining portion of the FIFO structure is still receiving data.

In one embodiment of the invention, memory structure 3 of FIG. 1 employs a 64-bit memory bus operating with a 66 MHz system clock. Throughput can further be enhanced by implementing a memory arbitration scheme such as a weighted priority round-robin memory arbitration technique. This technique enhances the memory structure's quantization and prioritization of memory accesses, further reducing latency loss and bandwidth requirements.

An embodiment of the present invention contemplates the implementation of a memory arbiter that, in this example, provides arbitration for six types of memory accesses. The arbiter sets priority between the Ethernet ports as highest priority and that of an expansion port as the lowest priority for each of the memory access types. Each access type is also prioritized such that the access type meets the latency requirement for maintaining wire speed switching of the supported function. The selected arbitration and associated priority are as shown in Table 1.

TABLE 1

| Access Type | Priority | Cycles/Access | Access/Frame # |
|---|---|---|---|
| Frame Data Writes | 1 | 4 | 2 |
| Frame Data Reads | 2 | 4 + 2 Turnaround | 2 |
| Transmit Descriptor Read | 3 | 1 + 2 Turnaround | 1 |
| Destination Address Read | 4 | 1 + 2 Turnaround | 1 |
| Transmit Descriptor Write | 5 | 1 | 1 |
| Source Address Write | 6 | 1 | 1 |

*64-byte Ethernet Frame

The cycles/access number refers to the number of system clock cycles required to perform memory access when interfacing, for example, to an external synchronous static RAM in flowthrough mode, with 64-bit data word width.

Data packets can be stored in Packet Data Storage Table 4 of FIG. 1, with a packet data address portion, and a packet data value portion. References to packets are often passed within switch 1, which can, for example, use the upper nine buffer bits of Table 4 as a pointer value. These pointer values are passed between the Free Buffer Manager 9 and ports 10a, 10b, 10c. The data address pointer value can also be passed between the switch Rx ports and the switch Tx ports via the transmit descriptor, which is similar to descriptor 14.

Figure 5:
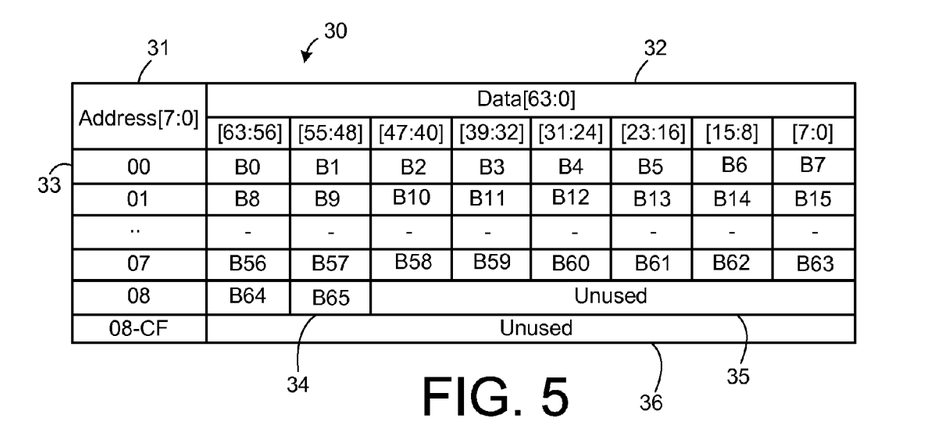
FIG. 5 is a table illustrative of storage for an individual 66-byte packet in the context of the invention herein.

FIG. 5 illustrates how packet data values can be stored. In the example of FIG. 5, a 66-byte packet is stored. As seen in FIG. 5, it is desired to store packet data in 64-bit wide memory segments, such that the efficiencies brought about by the 64-bit wide memory data path are further realized.

Figure 6:
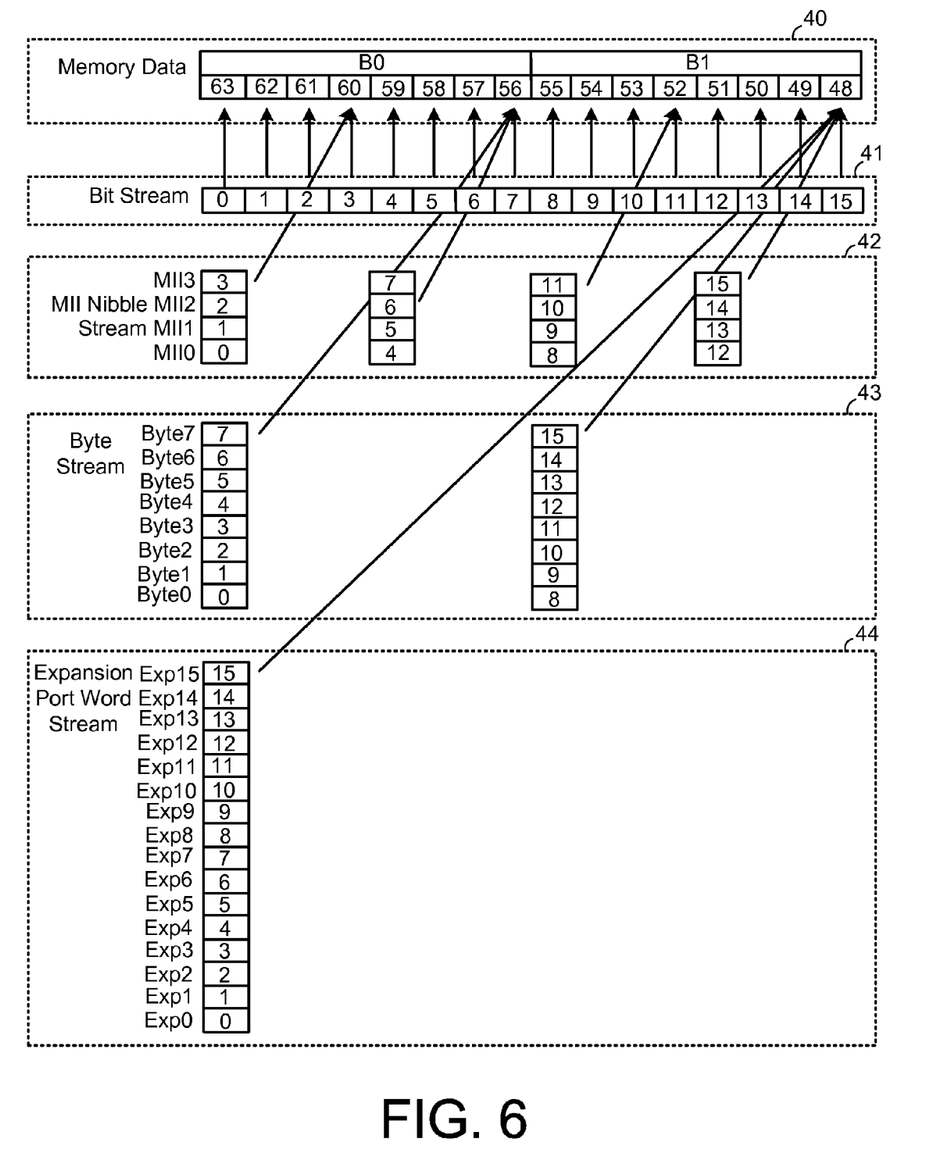
FIG. 6 is a an illustration of a packet data bit mapping table implementing an embodiment of the present invention.

FIG. 6 is exemplary of mapping a transmission format to other selected memory formats. Although the format normally used to display Ethernet data is a byte-stream format 40, FIG. 6 also displays the Ethernet data in a bit-stream format 41, a nibble-stream format 42, a byte-stream format 43 and a word-stream format 44.

In FIG. 1, it is desired that there be one Transmit Descriptor Table 6 for each transmit port. Thus, a switch having multiple ports (e.g., 4, 8, or 9 ports) could use a corresponding number of Transmit Descriptor Tables 6 (e.g., 4, 8, or 9 tables). It is also desired that each Transmit Descriptor Table 6 consist of a circular queue structure, i.e., a FIFO, that can hold a pointer value for each buffer in switch 1. Typically, a circular queue structure (FIFO) has a tail pointer and a head pointer that are maintained in each Tx block. When the values are the same, the queue is empty.

Figure 7:
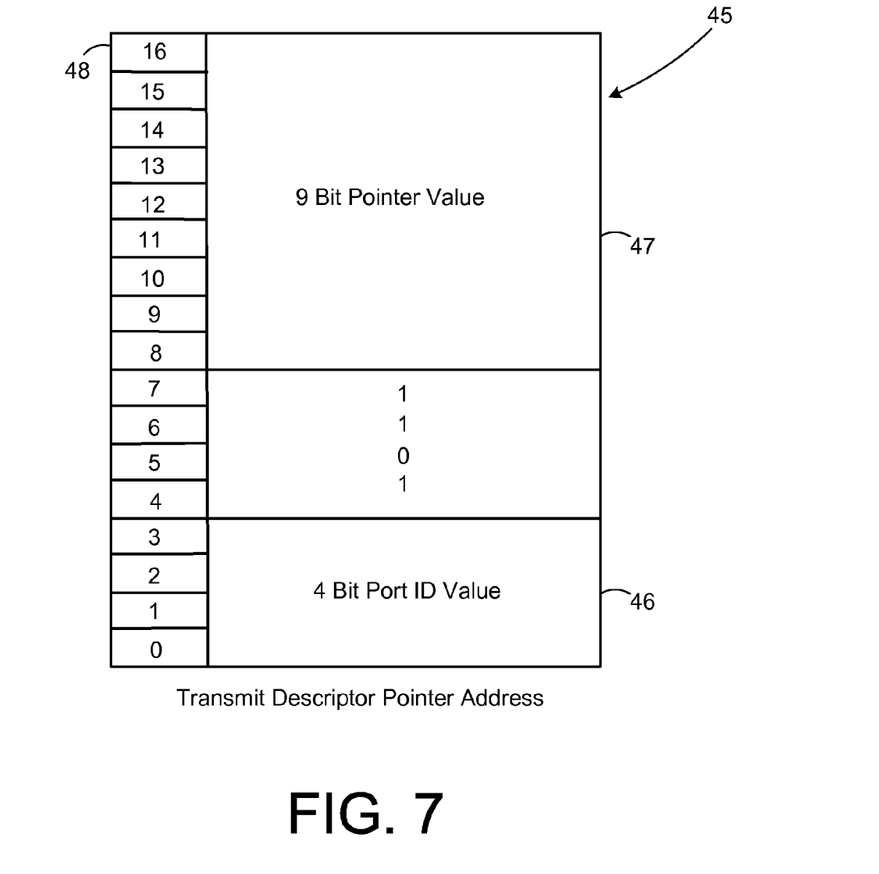
FIG. 7 is an illustration of a transmit descriptor pointer address as implemented by an embodiment of the present invention.

FIG. 7 illustrates the desired structure of a head pointer, a tail pointer, or both. In FIG. 7, head pointer 45 is described in this example, although a tail pointer can have the same structural format. Port ID 46 is desired to be static for each transmit port. Nine-bit pointer value 47, in this particular example, is indicative of the head pointer value. Where a reduced amount of memory is used to implement Table 6 of switch 1 in FIG. 1, then the sixteenth bit, 48, of FIG. 7 can be forced low on all memory accesses, having the effect of wrapping the transmit descriptor queues to fit within the available memory without affecting switch 1 operation.

Figure 8:
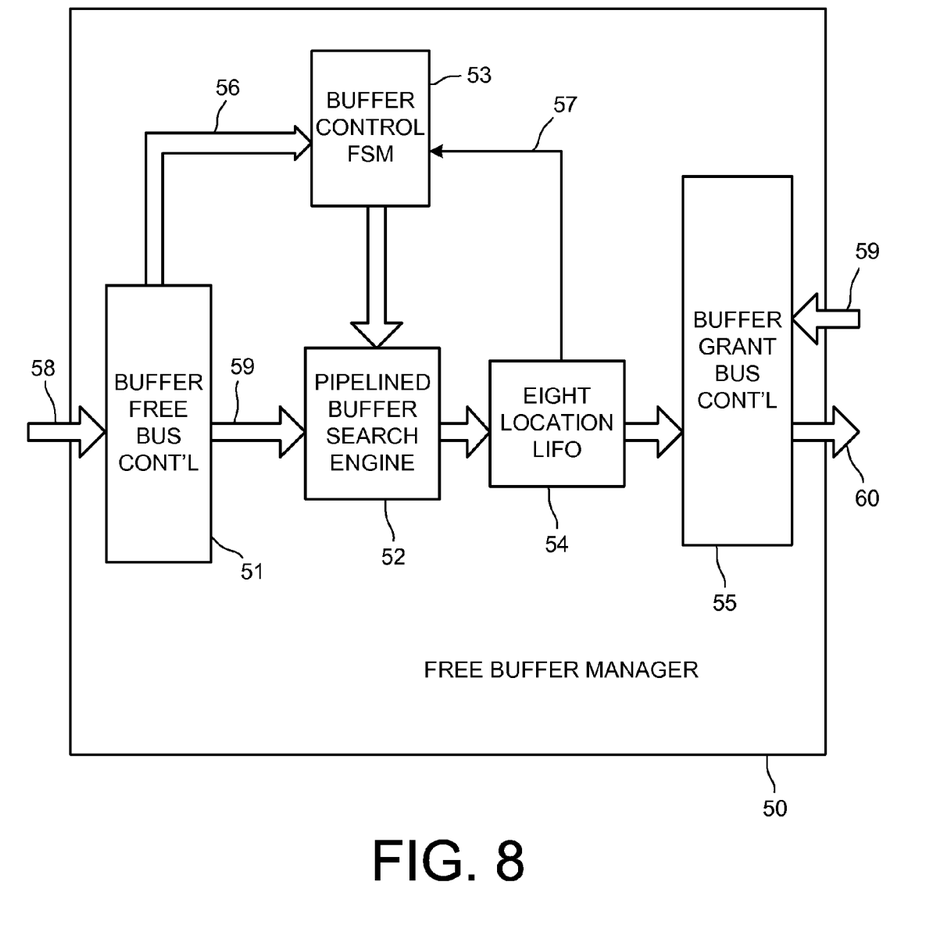
FIG. 8 is a block diagram of an embodiment of the free buffer manager.

FIG. 8 is an embodiment of a free buffer manager 50 similar to free buffer manager 9 shown in FIG. 1. Manager 50 can include a buffer free bus controller 51, a pipeline buffer search engine 52, a buffer control finite state machine 53, a buffer bus register 54 and a buffer grant bus controller 55. It is desirable that register 54 be a LIFO and, for the purposes of the description herein, register 54 is an eight-location LIFO. It is the responsibility of manager 50 to "grant" new buffers to ports before a data packet is received, and to collect, or "free," used buffers from ports that have transmitted a packet. Typically, one grant operation will be needed for each packet received by the switch, and one free operation will be needed for each packet transmitted by the switch.

In an embodiment of the present invention, a fixed number of buffers are employed. Used buffers are those that have been granted to a receive port, but have not yet been returned, or freed, by a transmit port. All of the remaining buffers are designated "unused". It also is the buffer manager's responsibility to track unused buffers so that they can be granted. Although one simple method to track unused buffers is to maintain a buffer list, such a list may create undesirable space limitations on a switch device because the list area must be long enough to store all of the buffers in a system and, further, each location in the list must be able to store the number of, or a pointer to, any buffer in the system. In a device having 512 list locations, for example, with each location having a corresponding nine-bit pointer, 4608 bits of storage would be required.

By contrast, another embodiment of the invention herein, implementing a bit-per-buffer method of tracking free buffers, reduces the storage requirement to only 512 bits, with each bit corresponding to a specific buffer. Here, a used buffer is indicated by setting the corresponding buffer bit. For example, setting the 368 bit in free buffer pool memory 8 in FIG. 1, can indicate that buffer 368 is currently being used.

Although this method does present an economy of storage and circuit area, it is further desired to employ a pipelined engine 52 to search for buffers in the bit array, such that the impact of "free" operations on search speeds is limited and that fast grant rates are allowed. Register 54 is preferred to be an eight-location LIFO to further increase the peak grant rate of search engine 52. Buffer free bus controller 51 captures requests 58 for the freeing of buffers, and presents request 59 to search engine 52. In addition, controller 51 can provide a similar request 56 to finite state machine 53. Register 54 also provides a status signal 57 to finite state machine 53 and, in conjunction with request data signal 56 from free bus controller 51, buffer control finite state machine 53 can select one of a set of defined states.

Figure 9:
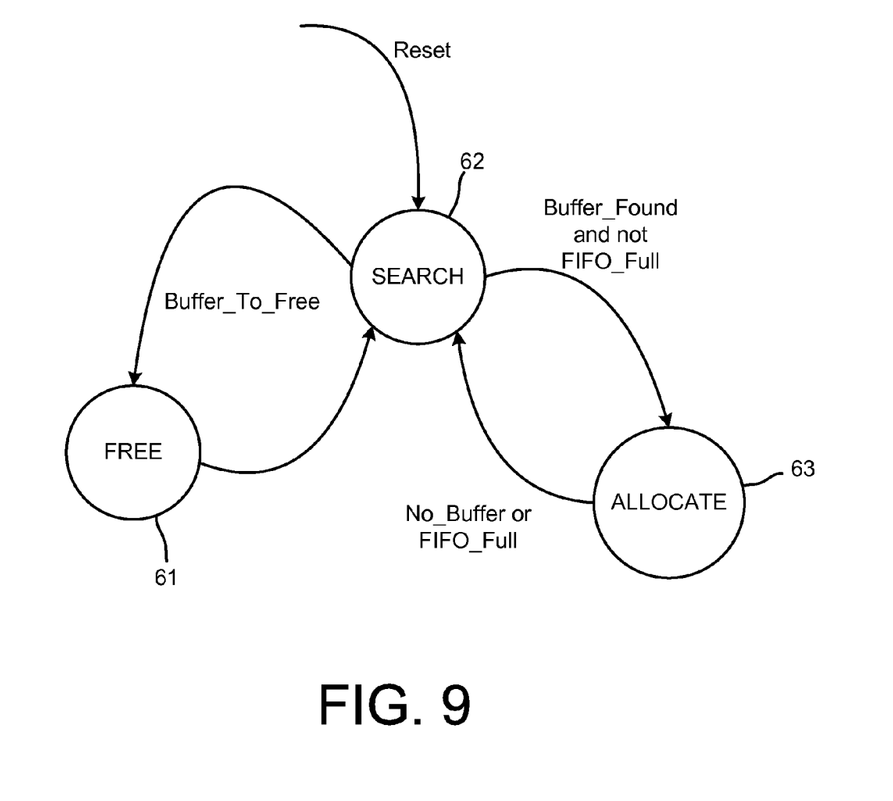
FIG. 9 is a state diagram illustrating the operation of one embodiment of the buffer control finite state machine in FIG. 8.

The state diagram of FIG. 9 illustrates the three states of state machine 53 in FIG. 8. These three states can include:

1) SEARCH (62)—search for zero-valued bits that are in the buffer control array, indicating the location of a free buffer;

2) FREE (61)—write a zero to a bit location specified by free controller 51, thus freeing the associated buffer for allocation; and 3) ALLOCATE (63)—write a one value to a bit location that was identified during search state 62 by search engine 52.

Returning to FIG. 8. Buffer Search Engine 52 is preferred to be pipelined in both address and data paths, around the buffer control bit memory array, in order to expedite the identification of available buffers. The eight-location LIFO 54 can store the locations of allocated buffers until they are needed by the Buffer Grant Bus Controller 55. Finally, Buffer Grant Bus Controller 55 waits for requests 59 from the received port for buffers and presents the buffer location 60 if available from the LIFO.

The foregoing merely illustrates the principles of the invention, and it will thus be appreciated that those skilled in the art will be able to devise various alternative arrangements which, although not explicitly described herein, embody the principles of the invention within the spirit and scope of the following claims.

What is claimed is:

1. A memory structure for use with a dual-speed Ethernet device, the memory structure comprising:
   an Address Resolution Table comprising a plurality of locations, each of said locations being configured to store a packet destination address, wherein the Address Resolution Table is configured to:
   resolve addresses in a packet-based network switch; and
   use a key to index one of said locations wherein the key is a predefined portion of the packet destination address associated with said indexed location via at least an offset in address space;
   a Packet Storage Table configured to:
   receive a packet for storage in the packet-based network switch; and
   share a preselected portion of memory with the Address Resolution Table; and
   a single buffer per packet mechanism configured to receive an individual packet, wherein the single buffer per packet mechanism is configured to perform only one transmit descriptor read per said individual packet and execute a first single access in order to locate the entire packet and a second single access to access the packet destination address at the indexed location using the key, wherein the entire packet is to be transmitted,
   wherein the memory structure implements memory arbitration for at least six types of memory accesses, and
   wherein the memory structure facilitates full-duplex, non-blocked Ethernet switch operations at wire speeds.

2. The memory structure of claim 1, further comprising at least one of:
   a Transmit Descriptor Table being associated with a corresponding packet-based network transmit port; and
   a Free Buffer Pool comprising a plurality of memory buffers, each of the plurality of memory buffers having a pre-determined number of memory locations associated therewith.

3. The memory structure of claim 1 wherein the packet-based network switch implements an IEEE standard 802.3 communication protocol.

4. The memory structure of claim 3 wherein the switch comprises a plurality of ports.

5. The memory structure of claim 4 wherein the switch comprises at least 8 ports.

6. The memory structure of claim 3 wherein the number of memory accesses required per Ethernet frame is one of:
   one cycle per frame for address resolution;
   one cycle per frame for address learning;
   one cycle per frame for transmission read;
   one cycle per frame for transmission write;
   one cycle per eight bytes for a frame data read; and
   one cycle per eight bytes for a frame data write.

7. The memory structure of claim 1 wherein the Address Resolution Table is implemented using an associative memory structure comprising one of an n-way associative memory, a hash table, a binary search structure, and a sequential search structure.

8. A memory structure comprising:
   an Address Resolution Table comprising an associative memory structure comprising a plurality of locations, each of said locations being configured to store a packet destination address, wherein the Address Resolution Table is configured to resolve addresses in a packet-based network switch and to use a key and an offset in address space to index one of said locations within the Address Resolution Table; and
   a single buffer per packet mechanism configured to receive an individual packet, perform only one transmit descriptor read per said individual packet, and execute a first single access in order to locate the entire packet and a second single access to locate the packet destination address at the indexed location using the key, wherein the entire packet is to be transmitted, wherein the key comprises a predefined portion of a packet destination address,
   wherein the memory structure implements a weighted priority, round-robin memory arbitration technique.

9. The memory structure of claim 8 further comprising a Packet Storage Table, the Packet Storage Table being configured to receive at least one of a Packet Data Address and a Packet Data Value.

10. The memory structure of claim 9 further comprising a Transmit Descriptor Table, the Transmit Descriptor Table being associated with a corresponding packet-based network transmit port, and the Transmit Descriptor Table being configured to receive a Table Descriptor Address and a Table Descriptor Value.

11. The memory structure of claim 8 wherein the associative memory structure comprises one of a direct-mapped/one-way associative memory structure and a two-way associative memory structure.

12. The memory structure of claim 11 wherein the number of memory accesses required per Ethernet frame is one of:
   one cycle per frame for address resolution;
   one cycle per frame for address learning;
   one cycle per frame for transmission read;
   one cycle per frame for transmission write;
   one cycle per eight bytes for a frame data read; and
   one cycle per eight bytes for a frame data write.

13. A memory structure comprising a memory block, the memory block comprising:
   an Address Resolution Table having an associative memory structure comprising a plurality of locations, each of said locations being configured to store a packet destination address, wherein the Address Resolution Table is configured to resolve addresses in a packet-based network switch and to use a key to index one of said locations within the Address Resolution Table, wherein the key comprises a predefined portion of a packet destination address associated with the indexed location through at least an offset in address space;
   a Transmit Descriptor Table, the Transmit Descriptor Table being associated with a corresponding packet-based network transmit port, and the Transmit Descriptor Table being configured to receive a Table Descriptor Address and a Table Descriptor Value;
   a Packet Storage Table, the Packet Storage Table being configured to receive at least one of a Packet Data Address portion and a Packet Data Value portion; and
   a single buffer per packet mechanism configured to receive an individual packet, to perform only one transmit descriptor read per said individual packet, and to execute a first single access in order to locate the entire packet and a second single access to locate the packet destination address at the indexed location using the key, wherein the entire packet is to be transmitted, and wherein the memory structure implements a weighted priority, round-robin memory arbitration technique.

14. The memory structure of claim 13 wherein the associative memory structure comprises one of an n-way associative memory, a hash table, a binary search structure, and a sequential search structure.

15. The memory structure of claim 13 wherein the memory block comprises a shared memory block.

16. The memory structure of claim 13 wherein the Transmit Descriptor Table comprises a FIFO memory structure.

17. The memory structure of claim 16 wherein the FIFO memory structure comprises a circular FIFO memory structure, the FIFO memory structure comprising a head memory pointer and a tail memory pointer.

18. The memory structure of claim 13 further comprising a Free Buffer Pool comprising a plurality of memory buffers, each of the plurality of memory buffers having a pre-determined number of memory locations associated therewith.

19. The memory structure of claim 18, wherein the Free Buffer Pool further comprises a buffer control memory.

20. The memory structure of claim 19, wherein the free buffer pool control memory comprises a plurality of data bits, ones of the plurality of data bits uniquely corresponding to ones of the pre-determined number of memory locations.

21. The memory structure of claim 18, wherein at least two of the Address Resolution Table, the Transmit Descriptor Table, the Packet Storage Table, and the Free Buffer Pool share a memory block.

22. The memory structure of claim 21 wherein a packet-based network switch including the memory structure implements an IEEE Standard 802.3 communication protocol and wherein a number of memory accesses required per Ethernet frame is one of:
   one cycle per frame for address resolution;
   one cycle per frame for address learning;
   one cycle per frame for transmission read;
   one cycle per frame for transmission write;
   one cycle per eight bytes for a frame data read; and
   one cycle per eight bytes for a frame data write.

23. The memory structure of claim 18, further comprising a free buffer manager, including:
   a buffer bus controller;
   a buffer bus register;
   a buffer control finite state machine operably coupled with the bus controller and the bus register; and
   a buffer search engine operably coupled with the bus controller, the bus register and the finite state machine.

24. The memory structure of claim 23 wherein the buffer bus controller comprises:
   a buffer free bus controller for detecting a buffer request and presenting the request to at least one of the finite state machine and the buffer search engine; and
   a buffer grant bus controller for granting an available free buffer, as indicated by the buffer, as indicated by the buffer bus register.

25. The memory structure of claim 23 wherein the buffer search engine comprises a pipelined buffer search engine.

26. The memory structure of claim 23 wherein the buffer bus register comprises a last-in-first-out (LIFO) memory structure.

27. The memory structure of claim 26 wherein the LIFO structure comprises an eight-location LIFO memory structure.

28. A packet-based switch comprising:
   a shared memory structure comprising an Address Resolution Table and a Packet Storage Table, wherein the address resolution table comprises a plurality of locations, each of said locations being configured to store a packet destination address;
   a key and an offset in address space to index one of said locations within the Address Resolution Table; and
   a single buffer per packet mechanism configured to receive an individual packet, perform only one transmit descriptor read per said individual packet, and execute a first single access in order to locate the packet destination address at the indexed location using the key, wherein the key is a predefined portion of the packet destination address at the indexed location, and a second single access to locate the entire packet, wherein the entire packet is to be transmitted,
   wherein the packet-based switch performs full-duplex, non-blocked Ethernet switch operations at wire speed.

29. The packet-based switch of claim 28 wherein the switch implements an IEEE Standard 802.3 communication protocol.

30. The packet-based switch of claim 29 wherein the switch comprises a plurality of ports.

31. The packet-based switch of claim 28 wherein the number of memory accesses required per Ethernet frame is one of:
   one cycle per frame for address resolution;
   one cycle per frame for address learning;
   one cycle per frame for transmission read;
   one cycle per frame for transmission write;
   one cycle per eight bytes for a frame data read; and
   one cycle per eight bytes for a frame data write.

32. A packet-based switch comprising a memory structure, the memory structure comprising:
- an Address Resolution Table implemented using an associative memory structure, the Address Resolution Table comprising a plurality of locations, each of said locations being configured to store a packet destination address, wherein the Address Resolution Table is configured to resolve addresses in a packet-based network switch and use a key to index one of said locations using at least an offset in address space wherein the key comprises a predefined portion of the packet destination address at the indexed location;
- a Transmit Descriptor Table, the Transmit Descriptor Table being associated with a corresponding packet-based network transmit port, and the Transmit Descriptor Table being configured to receive a Table Descriptor Address and a Table Descriptor Value;
- a Packet Storage Table, the Packet Storage Table configured to receive at least one of each of a Packet Data address portion and a Packet Data Value portion; and
- a single buffer per packet mechanism configured to receive an individual packet, perform only one transmit descriptor read per said individual packet, and execute a first single access in order to locate the entire packet and a second single access to locate the packet destination address at the indexed location using the key, wherein the entire packet is to be transmitted,
- wherein the memory structure facilitates full-duplex, non-blocked Ethernet switch operations at wire speed.

33. The packet-based switch of claim 32, wherein the associative memory structure comprises one of an n-way associative memory, a hash table, a binary search structure, and a sequential search structure.

34. The packet-based switch of claim 33 wherein the switch implements an IEEE Standard 802.3 communication protocol.

35. The packet-based switch of claim 34 wherein the switch comprises a plurality of ports.

36. The packet-based switch of claim 34 wherein the switch comprises at least 4 ports.

37. The packet-based switch of claim 34 wherein the switch comprises at least 8 ports.

38. The packet-based switch of claim 32, wherein the memory structure comprises a memory block, and wherein the memory block comprises a shared memory block.

39. The packet-based switch of claim 38 wherein the packet-based switch implements an IEEE Standard 802.3 communication protocol and wherein a number of memory accesses required per Ethernet frame is one of:
- one cycle per frame for address resolution;
- one cycle per frame for address learning;
- one cycle per frame for transmission read;
- one cycle per frame for transmission write;
- one cycle per eight bytes for a frame data read; and'
- one cycle per eight bytes for a frame data write.

40. The packet-based switch of claim 32 wherein the Transmit Descriptor Table comprises a first-in-first-out (FIFO) memory structure.

41. The packet-based switch of claim 40 wherein the FIFO memory structure comprises a circular FIFO memory structure, the circular FIFO memory structure comprising a head memory pointer and a tail memory pointer.

42. The packet-based switch of claim 32 further comprising a Free Buffer Pool comprising a plurality of memory buffers, each of the plurality of memory buffers having a pre-determined number of memory locations associated therewith.

43. The packet-based switch of claim 42, wherein the Free Buffer Pool further comprises a buffer control memory.

44. The packet-based switch of claim 43, wherein the buffer control memory comprises a plurality of data bits, ones of the plurality of data bits uniquely corresponding to ones of the pre-determined number of memory locations.

45. The packet-based switch of claim 43, further comprising a free buffer manager, including:
- a buffer bus controller;
- a buffer bus register;
- a buffer control finite state machine operably coupled with the bus controller and the bus register; and
- a buffer search engine operably coupled with the bus controller, the bus register and the finite state machine.

46. The packet-based switch of claim 45 wherein the buffer bus controller comprises:
- a buffer free bus controller configured to detect a buffer request and present the request to at least one of the finite state machine and the buffer search engine; and
- a buffer grant bus controller configured to grant an unavailable free buffer, as indicated by the buffer bus register.

47. The packet-based switch of claim 45 wherein the buffer search engine comprises a pipelined buffer search engine.

48. The packet-based switch of claim 45 wherein the buffer bus register comprises a last-in-first-out (LIFO) memory structure.

49. The packet-based switch of claim 48 wherein the LIFO memory structure comprises an eight-location LIFO memory structure.

50. The packet-based switch of claim 48 wherein the switch implements an IEEE Standard 802.3 communication protocol and wherein a number of memory accesses required per Ethernet frame is one of:
- one cycle per frame for address resolution;
- one cycle per frame for address learning;
- one cycle per frame for transmission read;
- one cycle per frame for transmission write;
- one cycle per eight bytes for a frame data read; and
- one cycle per eight bytes for a frame data write.

51. The packet-based switch of claim 42, wherein at least two of the Address Resolution Table, the Transmit Descriptor Table, the Packet Storage Table, and the Free Buffer Pool share a memory block.

52. A packet-based switch comprising an Address Resolution Table comprising a one-way associative memory structure comprising a plurality of locations, each of said locations being configured to store a packet destination address, wherein the Address Resolution Table is configured to use a key to index a one of said locations within the Address Resolution Table using at least an offset in address space, and a Packet Data Buffer Table configured to share a memory block with an Address Resolution Table, and a single buffer per packet mechanism configured to receive an individual packet, to perform only one transmit descriptor read per said individual packet, and to execute a first single access in order to locate an entire packet and a second single access to locate the packet destination address at the indexed location using the key, wherein the key is a predefined portion of the located packet destination address, wherein the entire packet is to be transmitted, wherein the packet-based switch performs full-duplex, non-blocked Ethernet switch operations at wire speed.

53. The packet-based switch of claim 52 wherein the switch comprises a plurality of ports.

54. The packet-based switch of claim 52 wherein the switch comprises at least 4 ports.

55. The packet-based switch of claim 52 wherein the switch comprises at least 8 ports.

56. The packet-based switch of claim 52 wherein the switch implements an IEEE Standard 802.3 communication protocol and wherein a number of memory accesses required per Ethernet frame is one of:
- one cycle per frame for address resolution;
- one cycle per frame for address learning;
- one cycle per frame for transmission read;
- one cycle per frame for transmission write;
- one cycle per eight bytes for a frame data read; and
- one cycle per eight bytes for a frame data write.

57. A packet-based switch comprising:
- an Address Resolution Table implemented using a direct-mapped/one-way associative memory structure comprising a plurality of locations, each of said locations being configured to store a packet destination address, wherein the Address Resolution Table is configured to resolve addresses in a packet-based network switch, and to use a key and an offset in address space to index a one of said locations; and
- a single buffer per packet mechanism configured to receive an individual packet, to perform only one transmit descriptor read per said individual packet, and to execute a first single access in order to locate an entire packet and a second single access to locate the packet destination address at the indexed location using the key, wherein the key is a predefined portion of the located packet destination address, wherein the entire packet is to be transmitted,
- wherein the packet-based switch makes a transmit descriptor request during a transmission of a previous frame, and
- wherein the packet-based switch facilitates full-duplex, non-blocked Ethernet switch operations at wire speed.

58. The packet-based switch of claim 57 wherein the direct-mapped/one-way associative memory is searched using a destination address key direct-mapped address search.

59. The packet-based switch of claim 58 wherein the switch implements an IEEE Standard 802.3 communication protocol.

60. The packet-based switch of claim 59, wherein the switch comprises a plurality of ports.

* * * * *

UNITED STATES PATENT AND TRADEMARK OFFICE
CERTIFICATE OF CORRECTION

| | | |
|---|---|---|
| PATENT NO. | : 7,899,052 B1 | |
| APPLICATION NO. | : 09/492265 | |
| DATED | : March 1, 2011 | |
| INVENTOR(S) | : Yi-Hsien Hao et al. | |

It is certified that error appears in the above-identified patent and that said Letters Patent is hereby corrected as shown below:

In column 9, line 58-59, in claim 20, delete "free buffer pool" and insert -- Free Buffer Pool --, therefor.

In column 11, line 54, in claim 39, delete "and'" and insert -- and --, therefor.

Signed and Sealed this
Tenth Day of May, 2011

David J. Kappos
*Director of the United States Patent and Trademark Office*